US012658210B1

(12) United States Patent
O'Brien et al.

(10) Patent No.: US 12,658,210 B1
(45) Date of Patent: Jun. 16, 2026

(54) LASER POWER MONITORING IN HARD DISK DRIVES

(71) Applicant: Avago Technologies International Sales Pte. Limited, Singapore (SG)

(72) Inventors: Scott O'Brien, Eden Prairie, MN (US); Greg Starr, Boulder, CO (US); Andrew Krebs, Eagan, MN (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 0 days.

(21) Appl. No.: 19/178,336

(22) Filed: Apr. 14, 2025

(51) Int. Cl.
| | |
|---|---|
| *G11B 7/1263* | (2012.01) |
| *G11B 5/02* | (2006.01) |
| *G11B 5/60* | (2006.01) |

(52) U.S. Cl.
CPC .............. *G11B 7/1263* (2013.01); *G11B 5/02* (2013.01); *G11B 5/607* (2013.01)

(58) Field of Classification Search
None
See application file for complete search history.

(56) References Cited

U.S. PATENT DOCUMENTS

| | | | |
|---|---|---|---|
| 7,680,160 | B2 | 3/2010 | Stewart et al. |
| 9,074,941 | B1 | 7/2015 | Krichevsky et al. |

| | | | | |
|---|---|---|---|---|
| 9,653,121 | B1 * | 5/2017 | Chu | ........................ G11B 27/36 |
| 10,707,969 | B1 | 7/2020 | Chun et al. | |
| 2001/0046243 | A1 * | 11/2001 | Schie | ...................... H01S 5/062 |
| | | | | 372/38.02 |
| 2003/0112732 | A1 * | 6/2003 | Masui | ................... G11B 7/1263 |
| | | | | 369/116 |
| 2004/0027947 | A1 * | 2/2004 | Asano | ................... G11B 7/0945 |
| 2005/0244160 | A1 | 11/2005 | Seo | |
| 2013/0163401 | A1 * | 6/2013 | Hori | ...................... G11B 7/1263 |
| | | | | 372/29.014 |
| 2016/0307590 | A1 | 10/2016 | Yang et al. | |
| 2018/0007760 | A1 * | 1/2018 | Ollila | ...................... H04N 23/55 |
| 2019/0212192 | A1 | 7/2019 | Kiely et al. | |

FOREIGN PATENT DOCUMENTS

| | | | |
|---|---|---|---|
| KR | 100884484 | B1 | 2/2009 |

* cited by examiner

*Primary Examiner* — Peter Vincent Agustin
(74) *Attorney, Agent, or Firm* — King Intellectual Asset Management

(57) ABSTRACT

Hard disk drives (HDD), preamplifiers for HDDs, and preamplifier circuits for HDDs. In an aspect, a preamplifier circuit might comprise one or more digital-to-analog converters (DAC) that can help reduce a thermal drift of a laser that assists in writing data to a storage medium of the HDD. A first DAC might skew a bias current between a laser power transducer and a temperature sensing transducer to reduce thermal drift. A second DAC might modify a differential current between two legs of the preamplifier circuit to further reduce thermal drift. In some cases, a calibration DAC can calibrate the output of the circuit.

20 Claims, 8 Drawing Sheets

Determine Value

<u>*605*</u>

Set Calibration DAC

<u>*610*</u>

Control PGA

<u>*615*</u>

*600*

Monitor Circuit Output with No Input

*805*

Determine Value to Minimize Drift

*810*

Set Temperature Compensation DAC

*815*

Control PGA

*820*

*800*

LASER POWER MONITORING IN HARD DISK DRIVES

TECHNICAL FIELD

This application relates generally to techniques for monitoring laser power and more specifically to techniques for monitoring laser power of a laser in a hard disk drive.

BACKGROUND

Hard disk drives (also referred to herein as "hard drives") generally store data on magnetic platters. An emerging technology is the use of heat to facilitate magnetic recording on a platter by heating the media to allow data to be written at greater density, often using a laser to spot-heat an area on the platter to which data will be written. An example of this technology is the HAMR™ technology available in drives manufactured by Seagate Technology™. In the use of such technology, the power of the laser is often subject to fairly precise control in order to provide enough heat to enable the high-density recording while avoiding excess heat, which can damage the platter or other components.

Consequently, there is a need for improved techniques to monitor and/or control the power output of the laser in a hard disk drive.

DETAILED DESCRIPTION

Some embodiments provide solutions, such as devices, systems, and methods, for monitoring and/or controlling the output power of a laser (e.g., a laser diode) in a hard disk drive (HDD). In some embodiments, a power monitoring data path can provide an improved solution to monitor the power of a laser in a HDD and therefore can provide input to control the output power. Some embodiments employ one or more digital-to-analog converters (DAC) to control the output power of the laser, including without limitation, the thermal drift of the laser. In particular embodiments, the laser is used to produce heat to increase the recording density of the recording media of the HDD. In some embodiments, controlling the thermal drift of the laser output power can enhance the ability of the laser to increase such recording density, and can do so efficiently and within time constraints imposed by normal operation of the HDD. As used herein, the term "thermal drift" refers broadly to any variance of the output power of a laser or laser diode (or in the output of a preamplifier circuit driving the laser or laser diode) with an ambient temperature of the environment in which the laser operates.

In particular, the power monitoring data path (PMDP) provided by various embodiments can provide more rapid, accurate, and/or precise measurement of laser power than conventional solutions. Thus, in some embodiments a PMDP can provide more efficient control over the laser power, which can be beneficial because laser power adjustment must be performed within a limited amount of time before the data is recorded to disk. As used herein, the terms "power monitoring data path" and "PDMP" refer broadly to any circuit, or portion of a circuit, that can be used to monitor, measure, or estimate the output power of, e.g., a laser or laser diode and/or to compare that output power with another value, e.g., an ambient temperature of an HDD.

Figure 1:
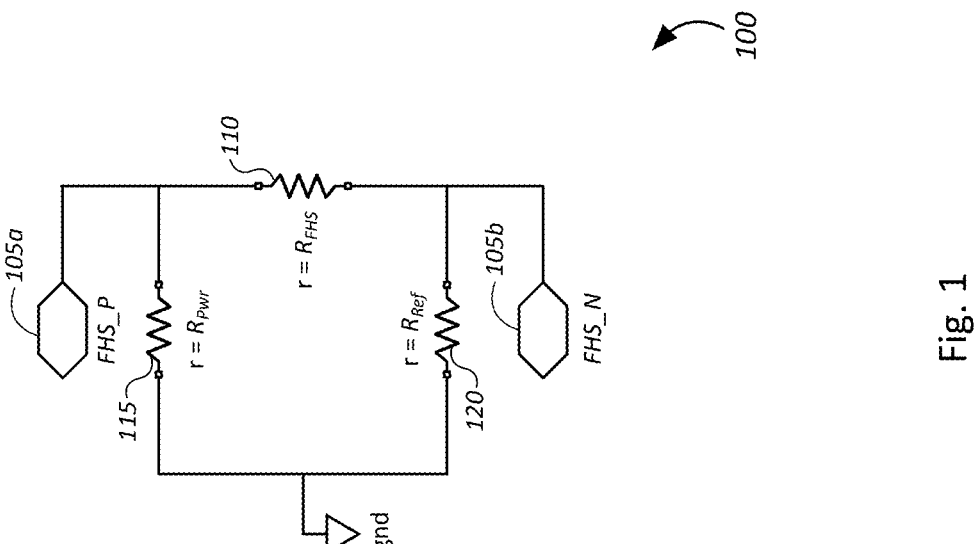
FIG. 1 is a circuit diagram illustrating a fly height sensing transducer of a preamplifier circuit, in accordance with some embodiments.

In many embodiments, a fly height sensing (FHS) block of a laser diode preamplifier can be configured as a PMDP and thus can be used to monitor laser power. A POSITA will understand, based on this disclosure, that FHS blocks often are used to sense disk proximity and/or thermal asperity in hard drives. FIG. 1 illustrates an exemplary FHS transducer 100 of a laser diode preamplifier for a HDD that employs heat-assisted magnetic recording. The FHS transducer 100 includes two external pins 105 (which individually are referred to herein as "input pins" and collectively can be considered an "input"): one for a positive current (FHS_P) and one for a negative current FHS_N. In some embodiments, as described in further detail below, these input pins can provide feedback from an (analog or digital) output of the preamplifier.

In some embodiments, the FHS transducer 100 also includes three transducers: a first transducer 110 that that measures write head proximity/thermal asperity ($R_{FHS}$) e.g., in conventional fashion, a second transducer 115 that measures laser power ($R_{Pwr}$), and a third transducer 120 that measures temperature ($R_{Ref}$). As known in the art, such transducers can be thermoresistive transducers, and a measurement of the resistance of such transducers can be used to measure (e.g., calculate, estimate, and/or otherwise determine) a corresponding temperature or change in temperature. In some embodiments, one or more of these transducers (e.g., a thermal asperity transducer) can operate similarly to corresponding transducers of conventional devices, although the information they provide can enable the functionality of the PDMPs and circuits described further herein.

In some embodiments, the reference temperature transducer 120, measures a reference temperature, e.g., a an ambient temperature inside an HDD comprising the FHS transducer 100, independent of the laser output and can be used to track the variation of $R_{Pwr}$ with temperature. In accordance with various embodiments, and as described in further detail below, this variation (an error term) can be removed and/or controlled for in some embodiments, as described in further detail below, when setting or controlling the output voltage of the preamplifier and/or, consequently, the output power of the laser. This can reduce the thermal drift of the laser power.

In a set of embodiments, a preamplifier for a laser diode can implement a PMDP as described herein. In an aspect, the PMDP can be an analog data path. In another aspect, the PMDP can provide various benefits over conventional implementations of laser power monitoring. For example, in some cases, a preamplifier circuit employing a PMDP in accordance with various embodiment can exhibit low noise and very low output change or "drift" as device junction temperature varies over a wide range. Some embodiments feature a wide programmable gain range and low pass filter (LPF) for optimizing speed and noise filtering.

As described in further detail below, a circuit in accordance with some embodiments comprises one or more digital-to-analog converters (DAC). As used herein, the term "circuit" is used broadly to include any group of electrical or electronic components in electrical communication. In various embodiments, a circuit can comprise one or more current sources, resistors, transducers, logic components, and/or other semiconductors. For example, some embodiments feature a bias current skewing (BCS) DAC that skews the current of the transducer bias driver between two input pins. In some embodiments this can reduce thermal drift, e.g., due to device mismatch. Furthermore, such a circuit allows the bias between two transducers to be skewed, which may offer additional benefits. Some embodiments include a temperature compensating DAC that that can reduce thermal drift further. The temperature compensating DAC can operate the output of the PMDP over a temperature range without any input stimulus, measuring voltage drift, and setting the compensating DAC to an optimal value such that drift over this temperature range is minimized.

The term, "logic," is used herein to refer to broadly to any tangible representation of the techniques, principles, and/or methodologies that govern the behavior of electronic components (including without limitation, processors, circuits, devices, etc.) and systems (including without limitation computer systems) to perform and/or achieve specific operations, functions, and/or outcomes in accordance with embodiments described herein. Logic can include a wide array of elements including software instructions (which can be encoded on non-transitory computer-readable media, loaded into a working memory, executed/executable by a hardware processor), firmware instructions (which can be executed and/or executable by a processor or can be otherwise executable and can be stored, e.g., in a programmable memory), and/or hardware instructions and/or configurations; these instructions/configurations collectively can instruct such electronic components and systems how to process information and execute tasks in accordance with various embodiments. Thus, some or all of the logic enabling or causing the performance of some or all of the operations described herein might be encoded in hardware and/or firmware circuitry and/or executed directly by such circuitry. In some embodiments, hardware and/or firmware circuitry might be embodied by a semiconductor chip, system on a chip (SoC), application-specific integrated circuit (ASIC), programmable logic devices (e.g., field-programmable gate arrays (FPGA), programmable logic devices (PLD), such as erasable PLDs (EPLD), complex PLDs (CPLD), etc.), and/or the like.

As used herein, the term "digital-to-analog converter" or "DAC" refers broadly to any device that functions to confer a digital input signal to an analog output signal. The skilled artisan will appreciate that DACs are available with many different resolutions (e.g., 5-bit resolution, 8-bit resolution, 12-bit resolution, 24-bit

EXEMPLARY EMBODIMENTS

Certain exemplary embodiments are described below. Each of the described embodiments can be implemented separately or in any combination, as would be appreciated by one skilled in the art. Thus, no single embodiment or combination of embodiments should be considered limiting.

Figure 2:
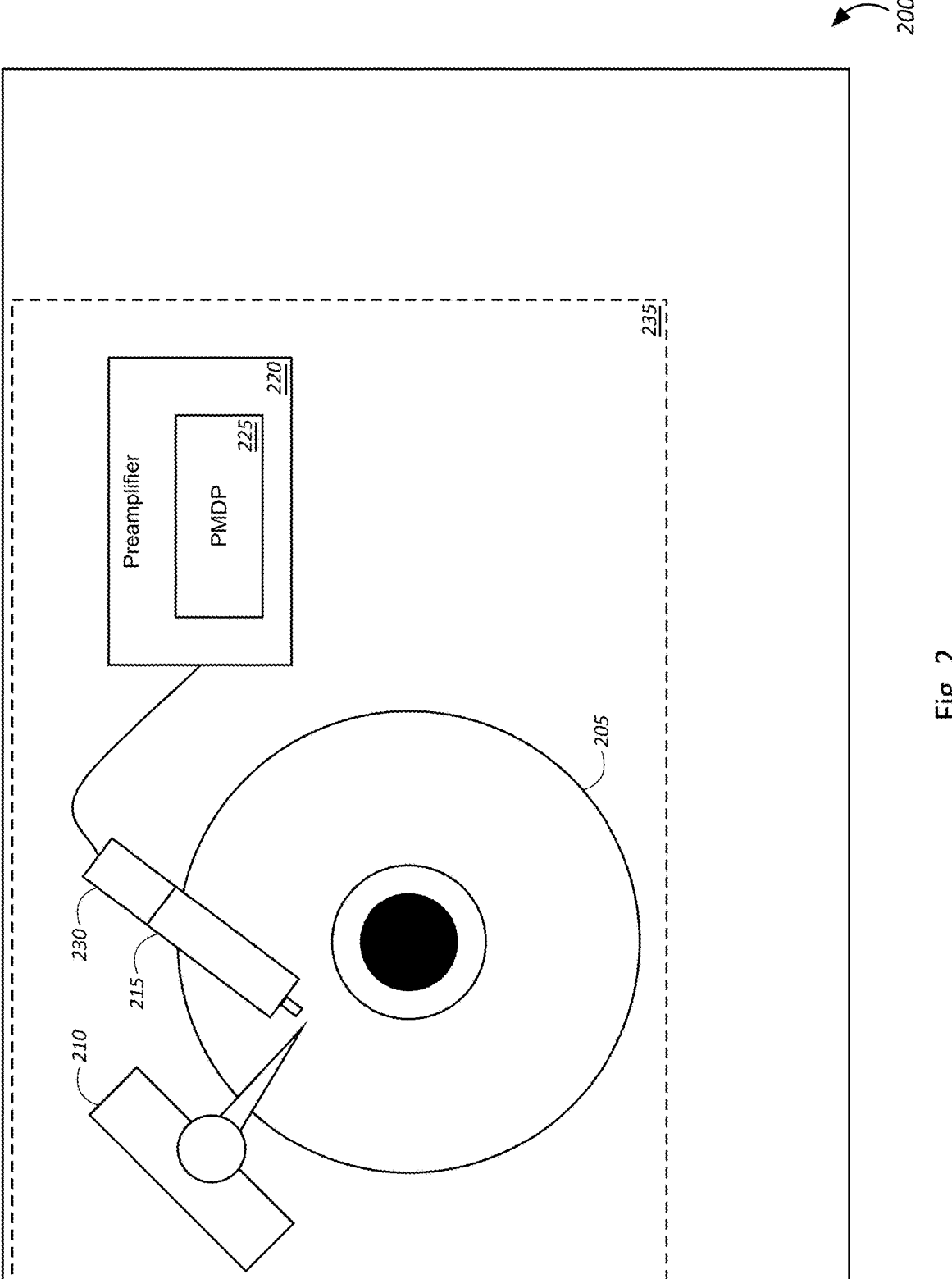
FIG. 2 is a block diagram illustrating components of a hard disk drive, in accordance with some embodiments.

Merely by way of example, FIG. 2 provides a simplified block diagram illustrating the components of a hard disk drive 200 that are relevant to this disclosure. The skilled reader will appreciate that, in the interest of brevity and simplicity, various components of the hard disk drive 200, such as communication interfaces, power supply, control electronics, spindle and motor, etc., have been omitted from FIG. 2 but that conventional components can be employed for any components omitted from FIG. 2.

As illustrated, the hard disk drive 200 comprises one or more platters (or disks) 205 that generally spins around a spindle and comprises magnetic media onto which data can be recorded (or written) and from which recorded data can be read. The hard disk drive 200 further comprises a write head 210 which magnetizes the media on the platter 205 to record bits of data. As mentioned above, the performance of the write head 210 and/or the density with which data can be recorded by the write head 210 can be improved by locally heating an area of the media of the platter 205 prior to recording the data. As such, the drive 200 further comprises a laser 215 (e.g., a laser diode) that is driven by a preamplifier 220.

In some embodiments, the preamplifier 220 can control aspects of the operation of the laser 215, including without limitation the amount of power supplied to the laser 215 and/or the power at which the laser operates 215. In some embodiments, the preamplifier 220 comprises a PMDP 225, which can operate to monitor the power of the laser and/or to control (e.g., via the preamplifier 220) the amount of power supplied to the laser 215. In some embodiments, the preamplifier 220 provides a control signal to an amplifier 230, which in turn provides a current to power the laser 215. This disclosure uses the term "drive" to describe the transmission of the control signal from the preamplifier 220 to the amplifier 230 that powers the laser 215, such that the preamplifier 230 drives the laser 215 through the transmission of this control signal.

While the components of FIG. 2 are arranged in a simplified manner to highlight certain concepts of various embodiments, it should be appreciated that the scale and/or arrangement of these components is illustrative in nature and should not be considered limiting. For example, while the laser 215 is shown separate from the write head 210 for ease of illustration, the skilled reader should appreciate that the laser 215 often will be integrated into the write head 210. It should also be appreciated that the hard drive 200 generally will comprise a read head (not illustrated in FIG. 2) that operates to read data written by the write head 210, and that the read head often can be integrated with the write head 210 as well. In particular embodiments, the write head 210 will include a fly high sensor (FHS), e.g., the FHS 100 of FIG. 1 that can detect the distance between the write head 210 and the magnetic media of the platter 210. Thus, in particular embodiments, the preamplifier 220 and/or the amplifier 230 can be incorporated within and/or packaged with the laser 215, the FHS, and/or the write head 210. Similarly, while FIG. 2 illustrates an assembly 235 of a single platter 205, write head 210, laser 215, preamplifier 220, PMDP 225 and amplifier 230, it should be appreciated that many HDDs will include multiple platters, and in some embodiments, an HDD will include multiple assemblies 235, corresponding to the number of platters in the HDD.

Figure 3:
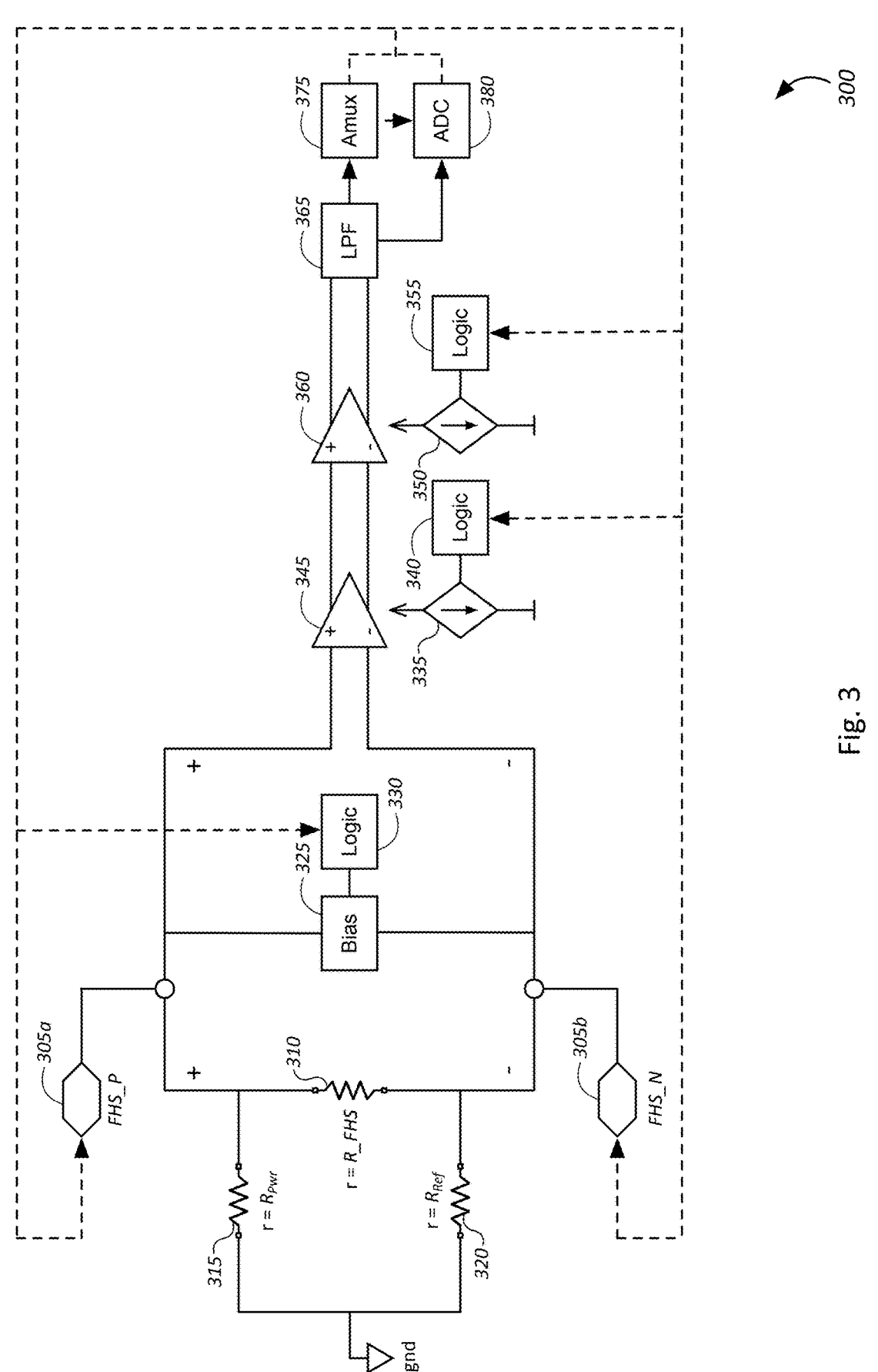
FIG. 3 is a circuit diagram illustrating a fly height sensor circuit for a preamplifier, in accordance with some embodiments.

FIG. 3 illustrates an exemplary FHS circuit 300 that can incorporate some or all of the PMDP 225 of FIG. 2 and/or that can monitor and/or control laser diode power, such as the power of the laser 215 of FIG. 2. In some embodiments, the circuit 300 can be implemented in, and/or can be integrated with, a preamplifier for a laser diode, such as the preamplifier 220 of FIG. 2. In an aspect, the circuit 300 can monitor and/or control laser diode power in a HDD, such as the HDD 200 of FIG. 2, although embodiments are not limited to this implementation. In some embodiments, the circuit 300 is incorporated in a semiconductor chip ("chip") that is integrated within a larger preamplifier and/or a chip that comprises the entire amplifier. In some embodiments, such a chip can include components and/or circuits additional to those of the circuit 300; similarly, the circuit 300 can include other components (e.g., buffers, etc.) not illustrated by FIG. 3.

The exemplary circuit 300 can comprise, and/or can be in communication with, a FHS block similar to the FHS transducer 100 illustrated by FIG. 1. Thus, for example, the circuit 300 comprises input pins 305 and transducers 310, 315, and 320, which are similar to the like-numbered components described in the context of FIG. 1. In some cases, the transducers 315 and 320 can be implemented as thermoresistive transducers to track the output power of the driven laser and the ambient temperature in the HDD enclosing the laser, respectively, and they can be disposed, in some embodiments, on the write head in proximity to the platter media. While the transducers 310, 315, 320 are illustrated as part of the circuit 300, it should be appreciated that, in some embodiments, the transducers 310, 315, and/or 320 might not be part of the circuit 300 itself, so long as their measured values are available to the circuit 300 and/or components thereof, e.g., to perform the monitoring and/or calculations described in further detail below.

In addition, the illustrated circuit 300 includes a BCS DAC 325, which is controlled by logic 330, which can be, in an example, hardware and/or firmware logic that configures and/or controls operation of the BCS DAC 325. In some cases, the logic 330 causes the BCS DAC 325 to skew a positive or negative bias current (e.g., as measured at pins 305a and 305b, respectively) through the circuit 300. As used herein, the term "bias current skewing DAC" and "BCS DAC" refer to any DAC or similar device that can operate to provide differential voltage and/or current adjustment between a negative current and a positive current in the circuit 300 and is not limited to particular modes of operation disclosed herein unless specifically so limited in the claims.

In some embodiments, the circuit 300 can further comprise a calibration DAC 335, along with corresponding logic 340, which can configure and/or control operation of the calibration DAC 335. In some embodiments, as described in further detail below, the logic 340 can control the operation of the calibration DAC 335 to calibrate outputs of the circuit 300 to a particular value and/or to a value within a particular range. In some embodiments, the calibration DAC 335 operates to control the output of a programmable gain amplifier (PGA) 340 to calibrate the output signal of the circuit 300. As used herein, therefore, the term "calibration DAC" refers to any DAC that operates to scale the overall output of the circuit 300 to a specified (e.g., desired or optimal) value or within a specified (e.g., desired or optimal) range and is not limited to particular modes of operation disclosed herein unless specifically so limited in the claims. This calibration can ensure that variable output of the circuit 300 does not fall outside a range in which the results of the laser power monitoring are useful and/or easily measurable or resolvable and/or outside a range of permissible input for the laser diode driven by the preamplifier comprising the circuit 300.

In some embodiments, the circuit 300 can further comprise a temperature compensation DAC 350, along with logic 355 to control operation of the temperature compensation DAC 350. As explained in further detail below, the temperature compensation DAC 350 can be set to a value that reduces (or further reduces), minimizes, optimizes and/or controls a thermal drift of a laser diode driven by the preamplifier (e.g., the preamplifier 220 of FIG. 2). As used herein, the term "temperature compensation DAC" therefore refers to any DAC that operates to adjust a thermal drift of the amount of power supplied to a laser and is not limited to particular modes of operation disclosed herein unless specifically so limited in the claims. In some embodiments, the temperature compensation DAC 350 provides a voltage differential between a first (e.g., positive) and second (e.g., negative) legs of the circuit 300 (e.g., as shown by the + and – signs on FIG. 3).

In some embodiments, the circuit 300 includes a low pass filter 365 that can filter noise from the output of the circuit 300. Together, the DACs 325, 335, and 350, along with the PGAs 345, 360 and the low pass filter 365 can provide a wide programmable gain range for the preamplifier 325 while maintaining low noise, which improves resolution and accuracy of the circuit 300. It should be noted, however, that none of these components are required of every embodiment, and that various embodiments can provide some or all of the same benefits, possibly somewhat less effectively or efficiently. For example, some embodiments might comprise only a BCS DAC 325 (and/or associated logic 330), without any other DACs, logic, or filters. Such embodiments can control, reduce, minimize and/or optimize thermal drift but might be able to do so more effectively or precisely when a temperature compensation DAC 350 is employed as well.

The circuit 300 can also include one or more outputs, which can be used to provide input to a laser diode amplifier (not shown in FIGS. 2 and 3) and/or other preamplifier stages and/or to provide input to other components of the circuit 300, a PMDP within such a circuit, and/or other components of an HDD comprising such a circuit. Merely by way of example, the exemplary circuit 300 of FIG. 3 includes two outputs: an analog output 375 and a digital output 380. In some embodiments, the analog output 375 can be an analog multiplexed output (Amux). The skilled artisan will understand that an Amux can multiplex multiple analog signals (e.g., using time division multiplexing (TDM), frequency division multiplexing (FDM), etc.) on a single channel. For example, in the circuit 300, the analog output 375 might function to multiplex several signals of data, including without limitation values of FHS_P, FHS_N, $R_{FHS}$, $R_{Ref}$, and/or $R_{Pwr}$, as well as, in some embodiments, a separate control signal for the laser amplifier. Alternatively and/or additionally, the circuit 300 might include an analog-to-digital converter (ADC) 380, which can convert such signals to digital signals, which can be multiplexed in a variety of ways known to the skilled artisan (e.g., using TDM, FDM, additive multiplexing). In some embodiments, the output from the Amux 375 is fed to the ADC 380 after the signals have been multiplexed, although this is not required. In some embodiments, the output from the Amux 375 might be provided to an ADC (not shown) that is outside a chip comprising the circuit 300.

As shown by the broken lines on FIG. 3, signals from the outputs 375 and/or 380 can be provided as inputs to the circuit 300 and/or the PMDP. For example, the voltages of FHS_P and/or FHS_N can be provided on respective input pins 305, and other data, such as values of $R_{FHS}$, $R_{Ref}$, and/or $R_{Pwr}$ can be provided as input to various logic (e.g., 330, 340, and 355) of the circuit. As described in further detail below, the values of these parameters can be used to monitor the output of the circuit 300, to derive other parameters (such as the differential voltage between the input pins 305), and/or as input to various calculations performed by components of the circuit 300.

Figure 4:
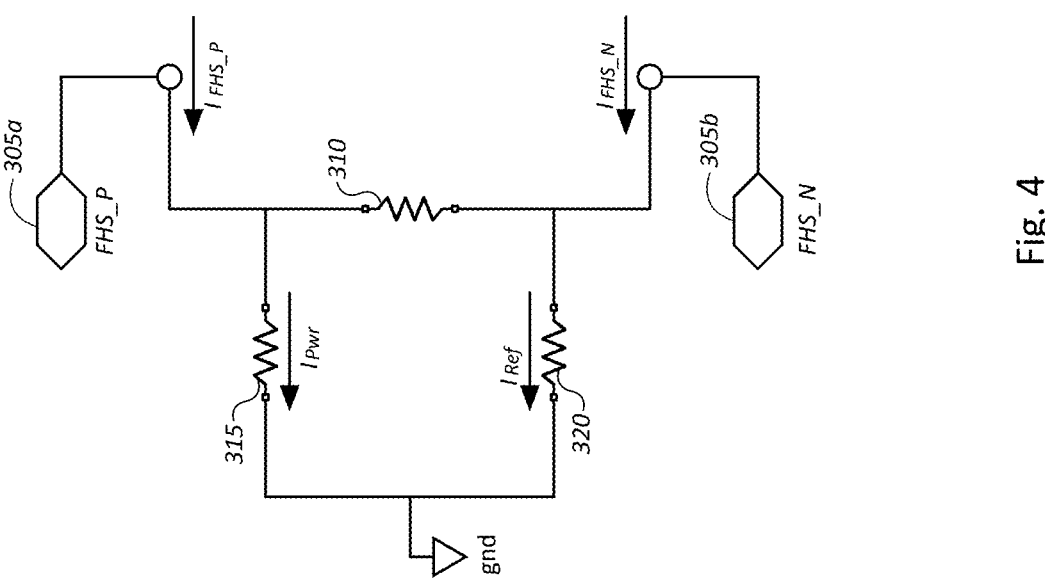
FIG. 4 is a block diagram illustrating a portion of a preamplifier circuit comprising a PMDP, in accordance with some embodiments.

FIG. 4 illustrates an alternative view of a portion 400 of the circuit 300 of FIG. 3 and illustrates terminology that will be discussed in further detail below. As shown in FIG. 4, the term $I_{FHS\_P}$ refers to the current on the positive leg of portion 400 of the circuit, while the term $I_{FHS\_N}$ refers to the current flowing on the negative leg of the portion 400. Similarly, the term $I_{Pwr}$ refers to the current flowing through the laser power transducer 315, while the term $I_{Ref}$ refers to the current flowing through the temperature transducer 320.

FIGS. 5-8 illustrate methods that can be performed by a preamplifier, e.g., the preamplifier 200 of FIG. 2, and/or portions thereof, such as the circuit 300 of FIG. 3 and/or components thereof. In particular aspects, various operations of the methods illustrated by FIGS. 5-8 can be performed by logic, e.g., hardware and/or firmware logic, within a preamplifier and/or by other devices, e.g., DACs controlled by such logic. As such, the descriptions of the methods illustrated by FIGS. 5-8 use the notation of electrical values illustrated by FIGS. 2-4 and might occasionally refer to various components of the circuits and PDMPs illustrated by those figures. Nonetheless, the reader should appreciate, however, that the methods illustrated by FIGS. 5-8 are not limited to any particular physical or architectural implementation.

Figure 5:
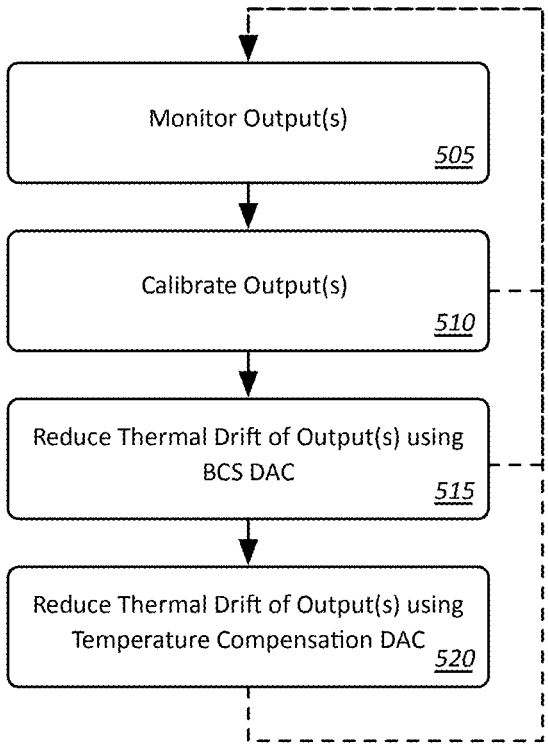
FIG. 5 is a flow diagram illustrating a method of monitoring and/or controlling output power of a laser diode, in accordance with some embodiments.

FIG. 5 illustrates a method 500 of monitoring and/or controlling the power of a laser diode, e.g., in a hard disk drive. In some embodiments, the method 500 can be performed by components of a preamplifier circuit, such as the circuit 300 of FIG. 3. In some embodiments, the method 500 might be performed once (e.g., prior to laser operation), while in some embodiments, the method 500 (and/or various operations thereof) might be performed iteratively (e.g., during operation of the laser). It should be noted that not all embodiments necessarily will perform all (or any) procedures of the method 500, and that procedures of the method 500 can be performed in any order in accordance with various embodiments, unless the context clearly indicates otherwise.

At block 505, the method 500 comprises monitoring one or more of the outputs of the preamplifier. In some embodiments, the method 500 might comprise monitoring an analog output of a preamplifier circuit, e.g., the Amux 375 of FIG. 3. In some embodiments, the method 500 might comprise monitoring a digital output, e.g., the ADC 380 of FIG. 3 and/or the output of an off-chip ADC receiving input from an Amux, such as the Amux 375. In an aspect, monitoring the output can comprise receiving and/or evaluating data signals from such outputs; these data signals can convey values of various parameters, including without limitation, a value of a laser power output parameter, which might be measured, e.g., as a resistance value from a transducer (e.g., $R_{Pwr}$, as shown in FIG. 3) or otherwise as a temperature, a unit of energy, a unit of power and or the like. Such values can also include, without limitation, a value of a reference temperature parameter, which might be measured, e.g., as a resistance value from a transducer (e.g., $R_{Ref}$ as illustrated in FIG. 3), a temperature (e.g., degrees Kelvin or Celsius, etc.) and/or can represent, e.g., a reference ambient temperature measured from an area, volume, or internal or external surface of a HDD. In some embodiments, the reference temperature value might be a measure of ambient in the HDD. In some embodiments, the monitored values can include, without limitation, a thermal asperity value of a parameter provided by a FHS sensor or other sensor that measures thermal asperity in a write head of an HDD, which can be measured e.g., as a resistance value from a thermal asperity transducer (e.g., $R_{FHS}$ as illustrated in FIG. 3). In some embodiments, the values of these parameters can be used to determine settings for various DACs and other components of a circuit (e.g., the circuit 300 of FIG. 3), for example, as described in further detail below. As noted above, the output(s) of the circuit can be fed as inputs to the DACs and/or corresponding logic that controls the DACs, and these DACs and/or corresponding logic can monitor the output(s) of the circuit using this input.

At block 510, the method 500 comprises calibrating one or more of the output(s) of the preamplifier. A number of techniques can be used to calibrate the preamplifier outputs in accordance with various embodiments, and the method 500 is not limited to any particular technique. Merely by way of example, in some embodiments calibrating output(s) can comprise setting a calibration DAC (such as the calibration DAC 335 of FIG. 3) to a value (referred to herein for clarity as the "calibration DAC value") that sets the one or more outputs to one or more nominal values within a specified range. For example, the calibration DAC might be set to a calibration DAC value that places the control signal for a laser amplifier to the midpoint of an operating range.

Figure 6:
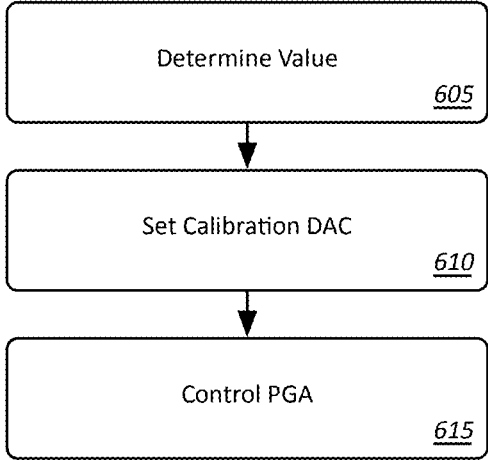
FIG. 6 is a flow diagram illustrating a method of calibrating a preamplifier circuit, in accordance with some embodiments.
Figure 6:

FIG. 6 illustrates a method 600 that provides one technique for calibrating a preamplifier circuit, such as the circuit 300 of FIG. 3. In some embodiments, the method 600 can be performed, e.g., by a calibration DAC 335 and or logic 340 that controls the calibration DAC 335. It should be noted that not all embodiments necessarily will perform all (or any) procedures of the method 600, and that procedures of the method 600 can be performed in any order in accordance with various embodiments, unless the context clearly indicates otherwise.

At block 605, the method 600 comprises determining a calibration DAC value that sets an output voltage of the circuit at a specified level. In some instances, the "output voltage" in this context might be a nominal output voltage, e.g., an output voltage that would be produced in the absence of any thermal drift, in which case the calibration might be performed before operation of the laser. In some instances, the output voltage might be the actual output voltage, as it varies with temperature. In such cases, the calibration might be performed (e.g., iteratively) while the laser is operating. In some embodiments, both techniques might be used.

The specified level to which the output voltage is calibrated can vary by embodiment and often is implementation-dependent. Merely by way of example, the specified level might be a midpoint of a valid output range. In a general sense, the calibration DAC might be set so that when output varies, any variance remains within a monitorable or measurable range and/or within a range that can allow the output level to be modified (e.g., as described elsewhere herein) to within a specified tolerance of a nominal or desired level.

At block 610, the method 600 comprises setting the calibration DAC to the determined calibration DAC value. In some embodiments, logic, such as a hardware and/or firmware logic (e.g., a logic circuit) can be used to control the calibration DAC by setting set the calibration DAC to the determined calibration DAC value, e.g., using techniques known to those skilled in the art and/or similar to the logic used to control the BCS DAC, as described in further detail below.

At block 615, the method 600 comprises controlling a PGA, e.g., with the calibration DAC. In some instances, the PGA might be controlled to modify a current in the positive and/or negative legs of the circuit 300, and/or to modify a differential voltage between the positive and negative legs of the circuit, in order to set the output voltage to the specified level. The skilled reader will understand, based on the disclosure herein, how the output of a DAC can be used to tune or control a PGA (or similar component) to adjust the gain of the circuit so that the output voltage is set to the desired level.

Returning to FIG. 5, at block 515, the method 500 comprises reducing the thermal drift of an output voltage of the preamplifier (e.g., as provided by an multiplexed analog output 375 or ACD 380 of the circuit 300) such as a control signal for a laser diode amplifier and/or, by extension, the thermal drift of the output power of the laser diode itself. In accordance with different embodiments, a number of different techniques can be used to reduce the thermal drift of the output voltage, and the method 500 is not limited to any particular technique. Merely by way of example, in some embodiments, reducing the thermal drift of the output voltage can be accomplished by setting a BCS DAC, e.g., the BCS DAC 325 of the circuit 330, to a determined value (referred to herein for clarity as the "BCS DAC value").

Figure 7:
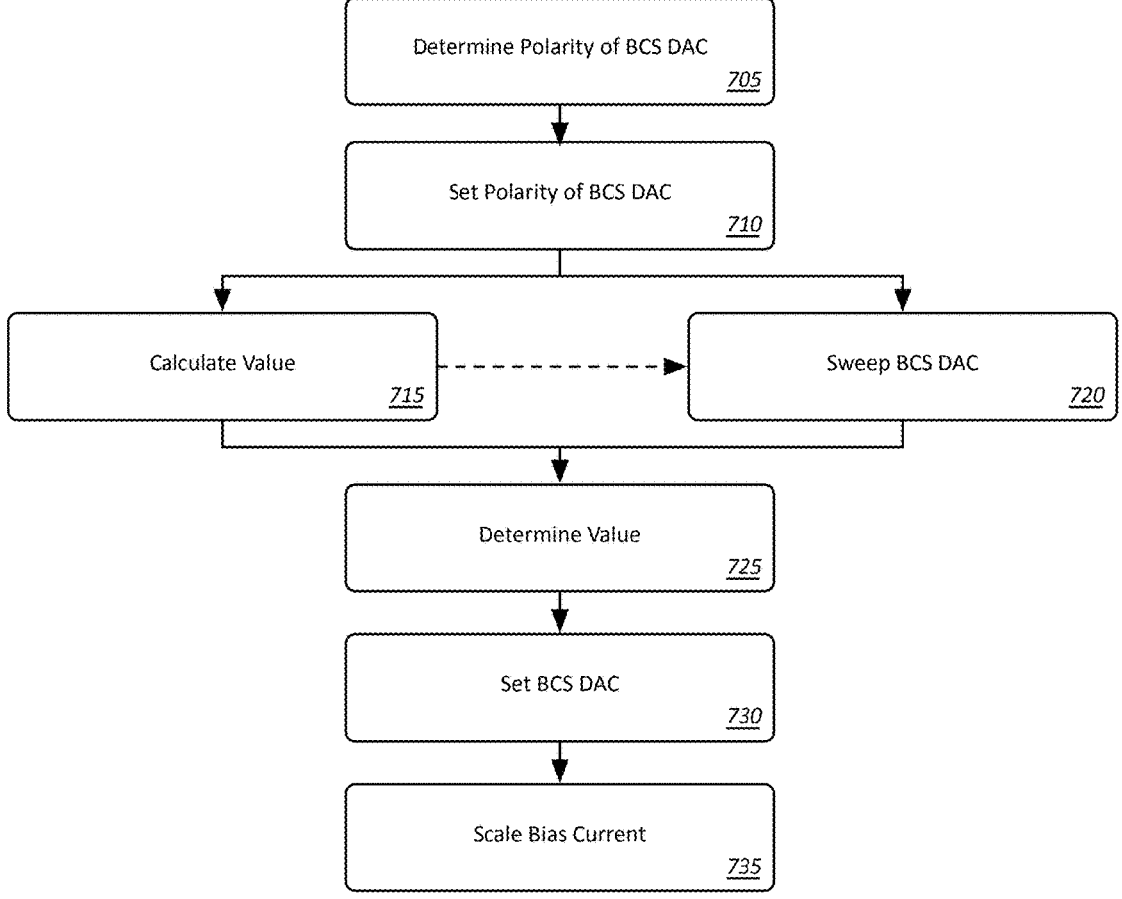
FIG. 7 is a flow diagram illustrating a method of reducing thermal drift of an output of a laser diode, in accordance with some embodiments.

FIG. 7 illustrates a method 700 of reducing thermal drift of a laser preamplifier output and/or a laser output power with a BCS DAC, in accordance with some embodiments. This method can be performed, e.g., by a BCS DAC 325 and/or logic 330 that controls the BCS DAC. It should be noted that not all embodiments necessarily will perform all (or any) procedures of the method 700, and that procedures of the method 700 can be performed in any order in accordance with various embodiments, unless the context clearly indicates otherwise.

At block 705, the method 700 comprises determining a proper polarity of the BCS DAC. As described in further detail below, the polarity of the BCS DAC determines which of the two bias currents ($I_{FHS\_P}$ or $I_{FHS\_N}$) is skewed by the operation of the BCS DAC. In some embodiments, determining a polarity of the of the BCS DAC comprises evaluating and/or comparing measurements of $R_{Ref}$ and $R_{Pwr}$ before operation of the BCS DAC. For example, in some embodiments, if the measured value of $R_{Ref}$ is greater than the measured value of $R_{Pwr}$, the proper polarity of the BCS DAC is determined to be 0d, while if the measured value of $R_{Ref}$ is less than the measured value of $R_{Pwr}$, the proper polarity of the BCS DAC is determined to be 1d. The skilled artisan will appreciate, based on the disclosure herein, that in some embodiments, a polarity of 0d configures the DAC in unipolar mode (e.g., with an output range of 0 to the full-scale output of the input voltage ($V_{Ref}$), which provides only positive voltage output, while a DAC polarity setting of 1d configures the DAC in bipolar mode (e.g., with an output range of $-V_{Ref}$ to $V_{Ref}$ or $-V_{Ref}/2$ to $V_{Ref}/2$). In some aspects, unipolar mode, the BCS DAC might scale only the positive bias current ($I_{FHS\_P}$), while in bipolar mode, the BCS DAC can scale the negative bias current ($I_{FHS\_N}$).

At block 710, the method 700 comprises setting a polarity of the BCS DAC to the determined proper polarity. A skilled artisan will understand that the technique used to set the polarity of the BCS DAC is often dependent on the implementation and can include, without limitation, setting a configuration bit in the DAC (e.g., to 0d or 1d, as described above), pulling a particular pin high or low, using an external operational amplifier (op-amp) or offset circuit, and/or the like, in accordance with various embodiments. As noted above, in some embodiments, when the polarity of the BCS DAC is 0d, the circuit will drive the full current of $I_{FHS\_P}$ and will scale the current of $I_{FHS\_N}$. Conversely, when the polarity of the BCS DAC is 1d, the circuit will drive the full current of $I_{FHS\_N}$ and will scale the current of $I_{FHS\_N}$. In some embodiments, the method 700 can further include estimating an optimal or otherwise appropriate BCS DAC value, using any suitable technique, including without limitation, those described below. In general, an appropriate BCS DAC value will produce an acceptable level of thermal drift in the control signal provided to the amplifier, in the output power of the laser itself, or both.

For example, in some embodiments, estimating an optimal or appropriate BCS DAC value might comprise calculating such a value. Thus the method 700 comprises calculating a BCS DAC value (referred in the equations below to as $FHS_{BiasSkew}$). Merely by way of example, in some embodiments, calculating an optimal or appropriate BCS DAC value comprises calculating a BCS DAC value that that reduces and/or optimizes a differential voltage $$\left(V_{In}^{Diff}\right)$$

at the input of the PDMP (e.g., a differential voltage between FHS_P and FHS_N at the positive and negative input pins of the PMDP). As used herein, the term "value" is used broadly when referring to a DAC, to include, for example, values set in configuration registers of the DAC, values provided to the DAC as input (for example, as described in further detail below, values provided as some or all of a digital word provided to the DAC as input) or any other value that configures the DAC to operate as described further herein. A skilled reader will appreciate that setting a DAC to a value will cause the DAC to provide an analog output (such as an analog voltage $V_{out}$) that corresponds to the value to which the DAC is set, for example by scaling a reference voltage $V_{in}$ by a factor such as the ratio of the DAC value (in this case, $FHS_{BiasSkew}$) to the size of the DAC's range (referred to here as $Range_{DAC}$):

$$V_{out} = V_{in}\left(\frac{Range_{DAC} - FHS_{BiasSkew}}{Range_{DAC}}\right) \quad \text{(Eq. 1)}$$

In some embodiments, the following calculations can be used to calculate the optimal BCS DAC value ($FHS_{BiasSkew}$). The following examples assume a BCS DAC with a range $Range_{DAC}=24$ (e.g., values 0d-23d). In the equations below, the term [4:0] refers to a 5-bit binary value, ranging from 0d-31d, which is limited (using any of a variety of techniques known in the art) to values of 0d-23d. This could be implemented, for example, by a 5-bit DAC. As another example, a 24-bit DAC, could accept a 24 bit digital word as input but might use only the five least significant bits of the digital word [4:0] as input to set the DAC value, which would allow for a range of 32 (e.g., 0d-31d). Some embodiments might limit this range for various reasons (e.g., if resolution beyond a certain range is unnecessary or inefficient, if other circuit or system components cannot support the full range allowed by the bit field, etc.). Merely by way of example, in some cases, the range of BCS DAC values, as mentioned above and described in further detail, might be further limited to a range of 24, with acceptable values of 0d-23d. In an embodiment where a DAC is a 24-bit DAC and the 5 least significant bits are employed for setting the value of the DAC, the 19 most significant bits [23:5] then could be used for configuring other parameters of the DAC. The skilled artisan will appreciate based on this disclosure that, depending on the implementation, a number of different DACs (with different resolutions) and/or a number of different input schemes/ranges can be employed in various embodiments.

As noted above, with reference to FIGS. 3 and 4, as a general matter, $$V_{In}^{Diff}$$

expresses the voltage difference between the positive and negative input pins.

$$V_{In}^{Diff} = FHS\_P - FHS\_N \qquad \text{(Eq. 2)}$$

The term $I_{Bias}$, as used herein, refers to the bias current in the PMDP, which, in some embodiments, is a constant current specified according to the implementation (2 mA in the examples herein). In the nominal condition of the circuit (with no thermal drift), $R_{pwr}=R_{Ref}$, $$V_{In}^{Diff} = 0$$

and $I_{Pwr}=I_{Ref}=I_{Bias}$, the values of $I_{Pwr}$, $I_{Ref}$, and $$V_{In}^{Diff}$$

can be calculated as follows:

$$I_{Pwr} = \frac{2R_{Ref} + R_{FHS}}{R_{Pwr} + R_{Ref} + R_{FHS}} I_{Bias} \qquad \text{(Eq. 3)}$$

$$I_{Ref} = \frac{2R_{Pwr} + R_{FHS}}{R_{Pwr} + R_{Ref} + R_{FHS}} I_{Bias} \qquad \text{(Eq. 4)}$$

$$V_{In}^{Diff} = I_{Bias} * R_{FHS} \left[ \frac{R_{Pwr} - R_{Ref}}{R_{Pwr} + R_{Ref} + R_{FHS}} \right] \qquad \text{(Eq. 5)}$$

In cases where $R_{Pwr} < R_{Ref}$ (and the polarity of the BCS DAC is set to 0d), the optimal BCS DAC value ($FHS_{BiasSkew}$) to reduce or minimize $$V_{In}^{Diff}$$

(e.g., to drive $$V_{In}^{Diff}$$

toward ~0 mV) can be calculated as follows:

$$FHS_{BiasSkew} = Range_{DAC} * \left( 1 - \frac{R_{Pwr}}{R_{Ref}} \right) \qquad \text{(Eq. 6)}$$

The skilled reader should appreciate that the above relationship is independent of current and of the value of $R_{FHS}$, which allows general applicability for different implementations. It should also be noted that, in this disclosure, the term "optimal" should be interpreted broadly to me "feasibly optimal," or "appropriate," and that "optimizing" the amount of thermal drift often will comprise determining a BCS DAC value that will produce an acceptable level of thermal drift in the circuit output and/or the output power of the laser diode. It should be appreciated that, while the laser output power ideally will have no thermal drift, that is often infeasible. Thus, the acceptable level of thermal drift might be a level below a particular threshold, the minimum level of thermal drift possible given hardware constraints and/or the operating environment, etc. For example, while the ideal BCS DAC value ($FHS_{BiasSkew}$) to produce a value of 0 for $$V_{In}^{Diff}$$

often will be a non-integer, possible values of a DAC by definition are limited to integer values, so the optimal BCS DAC value of $FHS_{BiasSkew}$ often will be defined as the calculated value of $FHS_{BiasSkew}$ rounded to the nearest integer. Alternatively, the optimal value of $FHS_{BiasSkew}$ could be the calculated value of $FHS_{BiasSkew}$ rounded down to the next highest integer, rounded up to the next lowest integer, etc. Likewise, the optimal value of $$V_{In}^{Diff}$$

often will not be zero, but would be the closest value to zero (the minimum absolute value) achievable using a digital input. In other embodiments, the digital input of the DAC might not be the only constraint on the optimal value of $FHS_{BiasSkew}$ and/or $$V_{In}^{Diff}.$$

For example, in some cases, the optimal value might be at the top (or bottom) of the range of $FHS_{BiasSkew}$, such that a higher (or lower) value of $FHS_{BiasSkew}$ theoretically could produce a lower absolute value of $$V_{In}^{Diff}$$

but such a value is not available within the configuration of the BCS DAC. The skilled artisan should appreciate, therefore, that an "optimal" value (of any value expressed in this disclosure) does not necessarily require the value to be optimal under a strict definition of that term. The same reasoning applies to terms such as "minimum" and "maximum," as those terms are used herein.

To illustrate an example of the relationship expressed by Eq. 6, in a DAC with a range of 24, if $R_{Pwr}$=200Ω and $R_{Temp}$=300Ω, the appropriate BCS DAC value ($FHS_{BiasSkew}$) would be calculated as follows:

$$FHS_{BiasSkew} = 24 * \left(1 - \frac{200}{300}\right) = 8.0 = 8d \qquad \text{(Eq. 7)}$$

Conversely, if $R_{Pwr}$=200Ω and $R_{Temp}$=230Ω, $$FHS_{BiasSkew} = 24 * \left(1 - \frac{200}{230}\right) = 3.13 \cong 3d \qquad \text{(Eq. 8)}$$

In this case (where $R_{Pwr} < R_{Ref}$) and the polarity of the BCS DAC is 0d, the current, as modified by the BCS DAC, flowing through the PMDP (as illustrated by FIG. 4, for example) can be expressed as the following:

$$I_{FHS\_P} = I_{Bias} \qquad \text{(Eq. 9)}$$

$$I_{FHS\_N} = \frac{Range_{DAC} - FHS_{BiasSkew}[4:0]}{Range_{DAC}} I_{Bias} \qquad \text{(Eq. 10)}$$

$$I_{Pwr} = \frac{R_{Temp}(I_{FHS\_P} + I_{FHS\_N}) + R_{FHS}I_{FHS\_P}}{R_{Pwr} + R_{Ref} + R_{FHS}} \qquad \text{(Eq. 11)}$$

$$I_{Ref} = \frac{R_{Pwr}(I_{FHS\_P} + I_{FHS\_N}) + R_{FHS}I_{FHS\_N}}{R_{Pwr} + R_{Ref} + R_{FHS}} \qquad \text{(Eq. 12)}$$

When $R_{Pwr}d < R_{Temp}$, FHS_N will tend to be greater than FHS_P, and $$V_{In}^{Diff}$$

therefore will tend to have a negative value. Thus, in this case, the skilled artisan will appreciate that the value of $FHS_{BiasSkew}$ scales $I_{FHS\_N}$ but does not affect $I_{FHS\_P}$. Higher values of $FHS_{BiasSkew}$ will produce lower values of $I_{FHS\_N}$ and, correspondingly, lower values of $I_{Ref}$, which will tend to drive the value of $$V_{In}^{Diff}$$

higher.

Using these relationships, a scenario with $R_{Pwr}$=200Ω, $R_{Ref}$=230Ω, $R_{FHS}$=160Ω, $I_{Bias}$=2 mA, a BCS DAC value ($FHS_{BiasSkew}$) of 0d would produce the following results, according to Eq. 9-12:

$$I_{FHS\_P} = I_{Bias} = 2.0 \text{ mA} \qquad \text{(Eq. 13)}$$

$$I_{FHS\_N} = \frac{Range_{DAC} - FHS_{BiasSkew}}{Range_{DAC}} I_{Bias} = \left(\frac{24-0}{24}\right)2 = 2.0 \text{ mA} \qquad \text{(Eq. 14)}$$

$$I_{Pwr} = I_{Bias} = 2.0 \text{ mA} \qquad \text{(Eq. 15)}$$

$$I_{Ref} = \frac{R_{Pwr}(I_{FHS\_P} + I_{FHS\_N}) + R_{FHS}I_{FHS\_N}}{R_{Pwr} + R_{Ref} + R_{FHS}} = \qquad \text{(Eq. 16)}$$

-continued
$$\frac{200(2.0 + 2.0) + 160(2.0)}{200 + 230 + 160} = 2.1 \text{ mA}$$

These values result in a measured value of $$V_{In}^{Diff} \approx -16.3 \text{ mV},$$

which can be measured as the difference between the respective voltages at FHS_P and FHS_N.

In this scenario, the BCS DAC value ($FHS_{BiasSkew}$) should be set to 3d, as shown by Eq. 7 above. Setting the BCS DAC to 3d would produce the following results, according to Eq. 9-12:

$$I_{FHS\_P} = I_{Bias} = 2.0 \text{ mA} \qquad \text{(Eq. 17)}$$

$$I_{FHS\_N} = \frac{Range_{DAC} - FHS_{BiasSkew}}{Range_{DAC}} I_{Bias} = \left(\frac{24-3}{24}\right)2.0 = 1.75 \text{ mA} \qquad \text{(Eq. 18)}$$

$$I_{Pwr} = I_{Bias} = 2.0 \text{ mA} \qquad \text{(Eq. 19)}$$

$$I_{Temp} = \frac{R_{Pwr}(I_{FHS\_P} + I_{FHS\_N}) + R_{FHS}I_{FHS\_N}}{R_{Pwr} + R_{Ref} + R_{FHS}} = \qquad \text{(Eq. 20)}$$

$$\frac{200(2.0 + 1.75) + 160(1.75)}{200 + 230 + 160} = 1.75 \text{ mA}$$

These values produce a measured value of $$V_{In}^{Diff} \approx -0.7 \text{ mV},$$

which is an optimal result given the range of DAC values in this case.

In the case where $R_{Pwr} > R_{Temp}$ (and the polarity of the BCS DAC is set to 1d), FHS_P will tend to be greater than FHS_N, and $$V_{In}^{Diff}$$

therefore will tend to have a positive value. Thus, in this case, the skilled artisan will appreciate that the value of $FHS_{BiasSkew}$ scales $I_{FHS\_P}$ but does not affect $I_{FHS\_N}$. Higher values of $FHS_{BiasSkew}$ will produce lower values of $I_{FHS\_P}$ and, correspondingly, lower values of $I_{Pwr}$, which will tend to drive the value of $$V_{In}^{Diff}$$

lower. In such cases, the optimal BCS DAC value ($FHS_{BiasSkew}$) to reduce or minimize $$V_{In}^{Diff}$$

(e.g., to drive $$V_{In}^{Diff}$$

toward ~0 mV) can be calculated as follows:

$$FHS_{BiasSkew} = 24 * \left(1 - \frac{R_{Ref}}{R_{Pwr}}\right) \qquad \text{(Eq. 21)}$$

In this case, the current flows through the PMDP (as illustrated by FIG. 4, for example) can be expressed as the following:

$$I_{FHS\_P} = \frac{Range_{DAC} - FHS[4:0]}{Range_{DAC}} I_{Bias} \qquad \text{(Eq. 22)}$$

$$I_{FHS\_N} = I_{Bias} \qquad \text{(Eq. 23)}$$

$$I_{Pwr} = \frac{R_{Ref}(I_{FHS\_P} + I_{FHS\_N}) + R_{FHS}I_{FHS\_P}}{R_{Pwr} + R_{Ref} + R_{FHS}} \qquad \text{(Eq. 24)}$$

$$I_{Ref} = \frac{R_{Pwr}(I_{FHS\_P} + I_{FHS\_N}) + R_{FHS}I_{FHS\_N}}{R_{Pwr} + R_{Ref} + R_{FHS}} \qquad \text{(Eq. 25)}$$

Using these relationships, a scenario with $R_{Pwr}$=200Ω, $R_{Temp}$=170Ω, $R_{FHS}$=160Ω, $I_{Bias}$=2 mA, setting BCS DAC value ($FHS_{BiasSkew}$) to 0d would produce the following results:

$$I_{FHS\_P} = \frac{Range_{DAC} - FHS[4:0]}{Range_{DAC}} I_{Bias} = \left(\frac{24-0}{24}\right)2.0 = 2.0 \text{ mA} \qquad \text{(Eq. 26)}$$

$$I_{FHS\_N} = I_{Bias} = 2.0 \text{ mA} \qquad \text{(Eq. 27)}$$

$$I_{Pwr} = \frac{R_{Ref}(I_{FHS\_P} + I_{FHS\_N}) + R_{FHS}I_{FHS\_P}}{R_{Pwr} + R_{Ref} + R_{FHS}} = \qquad \text{(Eq. 28)}$$

$$\frac{170(2.0 + 2.0) + 160(2.0)}{200 + 170 + 160} = 1.9 \text{ mA}$$

$$I_{Ref} = \frac{R_{Pwr}(I_{FHS\_P} + I_{FHS\_N}) + R_{FHS}I_{FHS\_N}}{R_{Pwr} + R_{Ref} + R_{FHS}} =$$

$$\frac{200(2.0 + 2.0) + 160(2.0)}{200 + 170 + 160} = 2.1 \text{ mA}$$

These values produce a measured result of $$V_{In}^{Diff} = -18.1 \text{ mV.}$$

Conversely, under the same scenario, setting the BCS DAC value ($FHS_{BiasSkew}$) to 4d would produce the following results:

$$I_{FHS\_P} = \frac{Range_{DAC} - FHS[4:0]}{Range_{DAC}} I_{Bias} = \left(\frac{24-0}{24}\right)2.0 = 1.67 \text{ mA} \qquad \text{(Eq. 29)}$$

$$I_{FHS\_N} = I_{Bias} = 2.0 \text{ mA} \qquad \text{(Eq. 30)}$$

$$I_{Pwr} = \frac{R_{Ref}(I_{FHS\_P} + I_{FHS\_N}) + R_{FHS}I_{FHS\_P}}{R_{Pwr} + R_{Ref} + R_{FHS}} = \qquad \text{(Eq. 31)}$$

-continued $$\frac{170(1.67 + 2.0) + 160(2.0)}{200 + 170 + 160} = 1.8 \text{ mA}$$

$$I_{Ref} = \frac{R_{Pwr}(I_{FHS\_P} + I_{FHS\_N}) + R_{FHS}I_{FHS\_N}}{R_{Pwr} + R_{Ref} + R_{FHS}} =$$

$$\frac{200(1.67 + 2.0) + 160(2.0)}{200 + 170 + 160} = 2.0 \text{ mA}$$

These values produced a measured result of $$V_{In}^{Diff} = -2.0 \text{ mV,}$$

which is an optimal result given the range of DAC values in this case.

Alternatively and/or additionally, estimating the optimal and/or appropriate BCS DAC value to produce an acceptable level of thermal drift might comprise empirically estimating such a value. Merely by way of example, at block 720, the method 700 comprises sweeping the BCS DAC through a range of values. Merely by way of example, in a DAC with a range of 0d-23d ($Range_{DAC}$=24), sweeping the BCS DAC can comprise setting the BCS DAC value to any plurality of values within that range. In a particular example, sweeping the DAC might comprise setting the BCS DAC value to 0, measuring the output voltage of the circuit and/or the inputs to the PMDP, incrementing the BCS DAC value (e.g., to 1), and measuring the output voltage of the circuit and/or the inputs to the PMDP, incrementing the BCS DAC value (e.g., by one, to a value to 2), measuring the output voltage of the circuit and/or the inputs to the PMDP, and repeating the incrementing/measuring operations through the entire range of BCS DAC values.

In other embodiments, sweeping the DAC value might comprise beginning at the top of the DAC output range and performing decrementing/measuring operations similar to those described above. In some embodiments, linear incrementing/decrementing is not required and/or increment/decrement intervals might be greater than one. For example, in some embodiments, sweeping the DAC might comprise first setting the DAC to a midpoint of the DAC range (or another value, such as a value calculated or estimated using the calculations described above in the context of block 715, as shown by the broken line on FIG. 7), measuring circuit output voltage and/or PMDP input values, then alternatively setting the DAC value to progressively higher and/or lower output values and performing corresponding measurement operations (e.g., in a 24-bit DAC, starting with a value of 12 and then setting the DAC to values of 11, 13, 10, 14, 9, 15, etc.). Nor does sweeping the DAC require setting the DAC to every value in the output range of the DAC. For example, in some cases, sweeping the DAC will demonstrate convergence of $$V_{In}^{Diff}$$

to an optimal or minimum value at some value of $FHS_{BiasSkew}$, such as values of $$V_{In}^{Diff}$$

decreasing monotonically while sweeping the BCS DAC from 0d-4d and then increasing monotonically when sweeping the BCS DAC from 4d-6d. At this point the logic might determine that 4d is the optimal value for FHS$_{BiasSkew}$. At this point, the logic might discontinue the sweeping operation.

At block 725, the method 700 comprises determining a BCS DAC value (e.g., FHS$_{BiasSkew}$) that produces an acceptable value of at least one of the output(s) of the circuit (e.g., an appropriate and/or optimal value). In some embodiments, this value, as noted above, might be a value that reduces, minimizes, and/or optimizes the value (or absolute value) of $$V_{In}^{Diff}.$$

Any suitable technique can be used to determine this value of the BCS DAC. In some embodiments, for example, the calculating and/or sweeping operations described in the context of blocks 715 and 720 can be used to determine the BCS DAC value that produces an acceptable output value (e.g., an analog value obtained from an Amux output 375). In some embodiments, an acceptable analog output might be a value at a lower bound of a valid range of analog values, such as a multiplexed voltage at the bottom of a valid range of voltages, or a minimum absolute value, for a parameter such as $$V_{In}^{Diff}.$$

In some embodiments, an acceptable output might be a digital value, such as a value of 0d from an ADC 380 of the circuit 300. In some embodiments, Alternatively, in some embodiments, any arbitrary voltage or digital value within a valid range of voltages could be defined as an acceptable value; for example, a value to which the circuit was calibrated (e.g., in block 510).

At block 730, the method 700 comprises setting the BCS DAC to the determined BCS DAC value. As noted above, setting a DAC, such as the BCS DAC 325, can comprise a number of operations. Merely by way of example, as described above, setting the BCS DAC value can comprise providing the value to the BCS DAC as an input value (e.g., a [4:0] digital word or portion of a digital word, setting one or more configuration registers of the BCS DAC, and/or the like.

Returning again to FIG. 5, at block 520, the method 500 comprises further controlling, minimizing, and/or reducing a thermal drift of the preamplifier output and/or a output power of a laser diode in communication with the preamplifier, e.g., with a temperature compensation DAC. In some cases, controlling a thermal drift of the laser diode comprises estimating a value (referred to herein for clarity as the "temperature compensation DAC value") of the temperature compensation DAC that further reduces or minimizes thermal drift.

Figure 8:
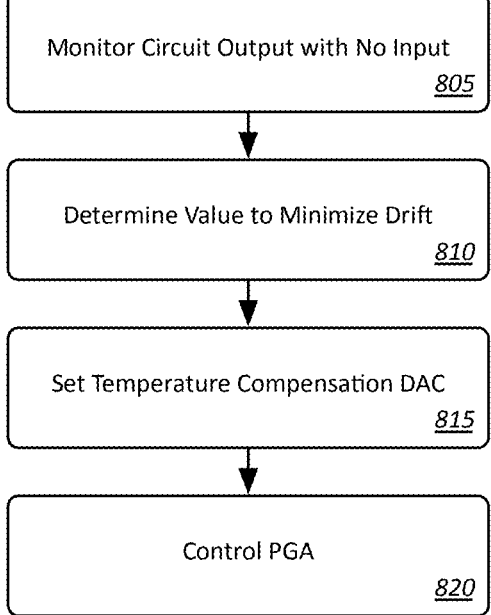
FIG. 8 is a flow diagram illustrating a method of further reducing thermal drift of an output of a laser diode, in accordance with some embodiments.
Figure 8:

Merely by way of example, FIG. 8 illustrates a method 800 of controlling thermal drift with a temperature compensation DAC in accordance with some embodiments. In some embodiments, the method 800 can be performed by a temperature compensation DAC 350 and/or corresponding logic 355 that controls the temperature compensation DAC 350. It should be noted that not all embodiments necessarily will perform all (or any) procedures of the method 800, and that procedures of the method 800 can be performed in any order in accordance with various embodiments, unless the context clearly indicates otherwise.

At block 805, the method 800 comprises monitoring the circuit output over a range of temperatures, in some cases, with no input stimulus (e.g., from the BCS DAC), and measuring thermal drift of the circuit output (e.g., drift in the analog voltage output from an Amux 375 of the preamplifier circuit 300 or a digital output of an ADC 380 in the circuit 300) over the range of temperatures.

At block 810, the method 800 comprises determining a temperature compensation DAC value that minimizes drift across a range of temperatures. In some embodiments, this can be accomplished by sweeping the temperature compensation DAC (for example, in a manner similar to that described with respect to the BCS DAC in the context of block 720 of FIG. 7) and repeating the monitoring/measuring operations at each temperature compensation DAC value. A temperature compensation DAC value that reduces, minimizes, or optimizes the output drift over the range of temperatures can be selected as the determined value of the temperature compensation DAC.

At block 815, the method 800 comprises setting the temperature compensation DAC to the determined temperature compensation DAC value. Any suitable technique, such as techniques described above for setting the BCS DAC, can be used to set the temperature compensation DAC value. At block 820, the method 800 comprises controlling a PGA with the temperature compensation DAC. Merely by way of example, the scaled output (e.g., a voltage) of the temperature compensation DAC, as determined by the temperature compensation DAC value, can be used as input to a PGA to tune or adjust the voltage and/or current in a positive leg of the amplifier circuit and/or a negative leg of the amplifier circuit.

FURTHER EXAMPLES

The following examples described various features of certain embodiments. All such features of each example described below can be combined in any fashion, and different embodiments thus can include any set or subset of the features described below, as well as various features of the embodiments described above. No particular feature or set of features should be considered required by all embodiments. Conversely, some embodiments can combine some or all of these features in any manner understood, in light of this disclosure, by a skilled artisan.

An exemplary laser diode preamplifier in accordance with some embodiments drives a laser diode in a hard disc drive. In some embodiments, the preamplifier comprises a circuit. In some embodiments, the circuit comprises one or more inputs. In some embodiments, the circuit comprises one or more outputs. In some embodiments, the circuit comprises hardware and/or firmware logic to monitor the one or more inputs. In some embodiments, the circuit comprises a bias-current-skewing (BSC) digital-to-analog converter (DAC) that scales a first current from at least one of the one or more inputs. In some embodiments, the circuit comprises hardware and/or firmware logic to determine a value of the BSC DAC (the "BSC DAC value") that reduces a thermal drift of output power of the laser diode. In some embodiments, the circuit comprises hardware and/or firmware logic to set the BSC DAC to the determined BSC DAC value.

In some embodiments, the circuit further comprises a calibration DAC. In some embodiments, the circuit further comprises hardware and/or firmware logic to determine a value of the calibration DAC (the "calibration DAC value") that sets the one or more outputs to one or more determined levels. In some embodiments, the circuit further comprises hardware and/or firmware logic to calibrate the circuit by setting the calibration DAC to the determined calibration DAC value.

In some embodiments, the circuit comprises a temperature compensation DAC. In some embodiments, the circuit comprises hardware and/or firmware logic to determine, based at least in part on monitoring the at least one output, a temperature compensation DAC value that reduces a thermal drift of the laser diode output power. In some embodiments, the circuit comprises hardware and/or firmware logic to set the temperature-compensation DAC to the determined temperature compensation DAC value.

In some embodiments, the circuit comprises hardware and/or firmware logic to measure, across a range of ambient temperatures, output values from at least one of the one or more outputs. In some embodiments, the determined temperature compensation DAC value minimizes a drift of the output value across the range of temperatures.

In some embodiments, at least one of the inputs provides data from at least one of the outputs of the circuit. In some embodiments, the determined BCS DAC value produces an acceptable value of a parameter derived from at least one of the one or more outputs of the circuit.

In some embodiments, the at least one input comprises a positive input pin of a fly height sensor that provides a positive bias current. In some embodiments, the at least one input comprises a negative input pin of the fly height sensor that provides a negative bias current. In some embodiments, the parameter is a differential voltage between a voltage of the positive input pin and a voltage of the negative input pin.

In some embodiments, the circuit comprises hardware and/or firmware logic to configure the BCS DAC to scale the positive bias current when a measured temperature value is higher than a measured laser diode output power value. In some embodiments, the circuit comprises hardware and/or firmware logic to configure the BCS DAC to scale the negative bias current when the measured temperature value is lower than the measured laser diode output power value.

In some embodiments, configuring the BCS DAC comprises setting a polarity of the BCS DAC.

In some embodiments, the hardware and/or firmware logic to determine the BCS DAC value comprises hardware and/or firmware logic to sweep the BCS DAC through a plurality of BCS DAC values. In some embodiments, the hardware and/or firmware logic to determine the BCS DAC value comprises hardware and/or firmware logic to monitor the differential voltage while sweeping the BCS DAC through the plurality of values.

In some embodiments, the hardware and/or firmware logic to determine a first value of the BCS DAC comprises hardware and/or firmware logic to calculate the BCS DAC value.

In some embodiments, the acceptable value is an analog value or an absolute analog value at a lower bound of a valid range of values of the differential voltage. In some embodiments, the acceptable value is a digital value of the differential voltage of zero.

In some embodiments, monitoring the one or more outputs comprises receiving, from the at least one output, a laser power transducer value from a first transducer that measures laser power output, a reference transducer value from a second transducer that measures a reference temperature value, and a thermal asperity transducer value from a third transducer that measures thermal asperity in a fly-height sensor.

value, and a thermal asperity transducer value from a third transducer that measures thermal asperity in a fly-height sensor.

A laser diode preamplifier, in accordance with a set of embodiments, that drives a laser diode in a hard disc drive might comprise a circuit. In some embodiments, the circuit comprises a bias-current-skewing (BCS) digital-to-analog converter (DAC) that scales a first current from at least one of the one or more inputs. In some embodiments, the circuit comprises hardware and/or firmware logic to reduce thermal drift of output power of the laser diode by setting the BCS DAC to a determined BCS DAC value. In some embodiments, the circuit comprises a temperature compensation DAC that modifies a differential between a second current in a positive leg and a third current in a negative leg of the circuit. In some embodiments, the circuit comprises and hardware and/or firmware logic to reduce the thermal drift of the output power of the laser diode by setting the temperature compensation DAC to a determined temperature compensation DAC value.

In some embodiments, the circuit comprises a calibration DAC that adjusts one or more of the second current or the third current. In some embodiments, the circuit comprises hardware and/or firmware logic to calibrate an output of the circuit to a determined level by setting the calibration DAC to a determined calibration DAC value.

In some embodiments, the circuit comprises hardware and/or firmware logic to determine the BCS DAC value.

In some embodiments, the circuit comprises a positive input pin of a fly height sensor that provides a positive bias current. In some embodiments, the circuit comprises a negative input pin of the fly height sensor that provides a negative bias current. In some embodiments, the determined BCS DAC value produces an acceptable value of a differential voltage between the positive input pin and the negative input pin.

In some embodiments, the hardware and/or firmware logic to determine the BCS DAC value comprises hardware and/or firmware logic to sweep the BCS DAC through a plurality of values. In some embodiments, the hardware and/or firmware logic to determine the BCS DAC value comprises hardware and/or firmware logic to monitor the differential voltage while sweeping the BCS DAC through the plurality of values.

In some embodiments, the hardware and/or firmware logic to determine a value of the BCS DAC comprises logic to calculate the BCS DAC value that produces an acceptable value of the differential voltage.

One set of embodiments provides a hard disk drives.

An exemplary hard disk drive in accordance with some embodiments might perform heat-assisted magnetic recording. In some embodiments, the hard disk drive comprises a storage medium. In some embodiments, the hard disk drive comprises a write head. In some embodiments, the hard disk drive comprises a laser diode that assists the write head in recording data to the storage medium. In some embodiments, the hard disk drive comprises a laser diode preamplifier, which can include, without limitation, a preamplifier such as those described above.

In some embodiments, the preamplifier comprises a circuit. In some embodiments, the circuit comprises one or more inputs. In some embodiments, the circuit comprises one or more outputs. In some embodiments, the circuit comprises hardware and/or firmware logic to monitor the one or more inputs. In some embodiments, the circuit comprises a bias-current-skewing (BCS) digital-to-analog converter (DAC) that scales a first current from at least one of the one or more inputs. In some embodiments, the circuit comprises and hardware and/or firmware logic to reduce thermal drift of output power of the laser diode by setting the BCS DAC to a determined value.

In some embodiments, the circuit comprises a temperature compensation DAC that modifies a differential between a second current in a positive leg and a third current in a negative leg of the circuit. In some embodiments, the circuit comprises hardware and/or firmware logic to reduce the thermal drift of the output power of the laser diode by setting the temperature compensation DAC to a second determined value. In some embodiments, the circuit comprises a calibration DAC that adjusts one or more of the second current or the third current. In some embodiments, the circuit comprises hardware and/or firmware logic to calibrate an output of the circuit to a determined level by setting the calibration DAC to a third determined value.

One set of embodiments provides methods.

An exemplary method might be performed by components of a hard disk drive and/or components of a preamplifier of a laser of such a hard disk drive. In some embodiments, the preamplifier that comprises a circuit, including without limitation the circuits described above. In some embodiments, the method comprises monitoring one or more inputs of such a circuit. In some embodiments, the method comprises monitoring one or more outputs of the circuit. In some embodiments, the method comprises calibrating one or more outputs of the circuit. In some embodiments, the method comprises reducing a thermal drift of the outputs, e.g., using the BCS DAC of the circuit. In some embodiments, the method comprises (further) reducing, e.g., using temperature compensation DAC, the thermal drift of the outputs.

In some embodiments calibrating the output(s) of the circuit comprises determining a calibration DAC value. In some embodiments calibrating the output(s) of the circuit comprises setting the calibration DAC to the determined calibration DAC value. In some embodiments calibrating the output(s) of the circuit comprises controlling a PGA, e.g., to adjust a differential between a first current in a positive leg of the circuit and a second current in a negative leg of the circuit.

In some embodiments, reducing the thermal drift of the output(s) comprises determining a polarity of the BCS DAC. In some embodiments, reducing the thermal drift of the output(s) comprises setting the BCS DAC to the determined polarity. In some embodiments, reducing the thermal drift of the output(s) comprises determining a BCS DAC value. In some embodiments, determining a BCS DAC value comprises sweeping the BCS DAC through a range of values. In some embodiments, determining a BCS DAC value comprises monitoring a parameter (e.g. a differential voltage between input pins) while sweeping the BCS DAC through the plurality of values. In some embodiments, determining a BCS DAC value comprises calculating a BCS DAC value produces an acceptable value of a parameter (e.g. a differential voltage between input pins) derived from the at least one of the circuit. In some embodiments, reducing the thermal drift of the output(s) comprises setting the BCS DAC to the determined BCS DAC value. In some embodiments, reducing the thermal drift of the output(s) comprises scaling a bias current provided by an input pin of the circuit.

In some embodiments, reducing the thermal drift of the output(s) comprises monitoring/measuring, across a range of ambient temperatures, output values from the at least one output (e.g., with no input). In some embodiments, the determined temperature compensation DAC value minimizes a drift of the output value across the range of temperatures. In some embodiments, reducing the thermal drift of the output(s) comprises setting the temperature compensation DAC to the determined temperature compensation DAC value. In some embodiments, reducing the thermal drift of the output(s) comprises controlling a PGA with the temperature compensation DAC, e.g., to tune or adjust the voltage and/or current in a positive leg of the amplifier circuit and/or a negative leg of the amplifier circuit.

CONCLUSION

In the foregoing description, for the purposes of explanation, numerous details are set forth to provide a thorough understanding of the described embodiments. It will be apparent to one skilled in the art, however, that other embodiments may be practiced without some of these details. In other instances, structures and devices are shown in block diagram form without full detail for the sake of clarity. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Thus, the foregoing description provides illustration and description of some features and aspect of various embodiments, but it is not intended to be exhaustive or to limit the embodiments in general to the precise form disclosed. One skilled in the art will recognize that modifications may be made in light of the above disclosure or may be acquired from practice of the implementations, all of which can fall within the scope of various embodiments. For example, as noted above, the methods and processes described herein may be implemented using software components, firmware and/or hardware components (including without limitation processors, other hardware circuitry, custom integrated circuits (ICs), programmable logic, etc.), and/or any combination thereof.

Further, while various methods and processes described herein may be described with respect to particular structural and/or functional components for ease of description, methods provided by various embodiments are not limited to any particular structural and/or functional architecture but instead can be implemented in any suitable hardware configuration. Similarly, while some functionality is ascribed to one or more system components, unless the context dictates otherwise, this functionality can be distributed among various other system components in accordance with the several embodiments.

Likewise, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with or without some features for ease of description and to illustrate aspects of those embodiments, the various components and/or features described herein with respect to a particular embodiment can be substituted, added and/or subtracted from among other described embodiments, unless the context dictates otherwise.

As used herein, the term "component" is intended to be broadly construed as hardware, firmware, software, or a combination of any of these. It will be apparent that systems and/or methods described herein may be implemented in different forms of hardware, firmware, and/or a combination of hardware and software. The actual specialized control hardware or software code used to implement these systems and/or methods does not limit any embodiments unless specifically recited in the claims below. Thus, when the operation and behavior of the systems and/or methods are described herein without reference to specific software code, one skilled in the art would understand that software and hardware can be used to implement the systems and/or methods based on the description herein.

In this disclosure, when an element is referred to herein as being "connected" or "coupled" to another element, it is to be understood that one element can be directly connected to the other element or have intervening elements present between the elements. In contrast, when an element is referred to as being "directly connected" or "directly coupled" to another element, it should be understood that no intervening elements are present in the "direct" connection between the elements. However, the existence of a direct connection does not preclude other connections, in which intervening elements may be present. Similarly, while the methods and processes described herein may be described in a particular order for ease of description, it should be understood that, unless the context dictates otherwise, intervening processes may take place before and/or after any portion of the described process, and, as noted above, described procedures may be reordered, added, and/or omitted in accordance with various embodiments.

In this application, the use of the singular includes the plural unless specifically stated otherwise, and use of the term "and" means "and/or" unless otherwise indicated. Also, as used herein, the term "or" is intended to be inclusive when used in a series and also may be used interchangeably with "and/or" unless explicitly stated otherwise (e.g., if used in combination with "either" or "only one of"). Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise. As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items. By way of example, the phrases "at least one of A, B, and C" or "at least one of A, B, or C" each refer to only A, only B, or only C; and/or any combination of A, B, and C. In instances where it is intended that a selection be of "at least one of each of A, B, and C," or alternatively, "at least one of A, at least one of B, and at least one of C," it is expressly described as such.

Unless otherwise indicated, all numbers used herein to express quantities, dimensions, and so forth should be understood as being modified in all instances by the term "about." As used herein, the articles "a" and "an" are intended to include one or more items and may be used interchangeably with "one or more." Similarly, as used herein, the article "the" is intended to include one or more items referenced in connection with the article "the" and may be used interchangeably with "the one or more." As used herein, the term "set" is intended to include one or more items (e.g., related items, unrelated items, a combination of related and unrelated items, and/or the like), and may be used interchangeably with "one or more." Where only one item is intended, the phrase "only one" or similar language is used. As used herein, the terms "has," "have," "having," or the like are intended to be open-ended terms. Further, the phrase "based on" is intended to mean "based, at least in part, on" unless explicitly stated otherwise. In the foregoing description, satisfying a threshold may, depending on the context, refer to a value being greater than the threshold, greater than or equal to the threshold, less than the threshold, less than or equal to the threshold, equal to the threshold, and/or the like, depending on the context.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Thus, while each dependent claim listed below may directly depend on only one claim, the disclosure of various implementations includes each dependent claim in combination with every other claim in the claim set. No element, act, or instruction used herein should be construed as critical or essential unless explicitly described as such.

The invention claimed is:

1. A laser diode preamplifier that drives a laser diode in a hard disc drive, the preamplifier comprising:
    a circuit, comprising:
        one or more inputs;
        one or more outputs;
        hardware and/or firmware logic to monitor at least one output;
        a bias-current-skewing (BCS) digital-to-analog converter (DAC) that scales a first current from at least one of the one or more inputs;
        hardware and/or firmware logic to determine a value of the BCS DAC (the "BCS DAC value") that reduces a thermal drift of output power of the laser diode; and
        hardware and/or firmware logic to set the BCS DAC to the determined BCS DAC value.

2. The laser diode preamplifier of claim 1, wherein the circuit further comprises:
    a calibration DAC;
    hardware and/or firmware logic to determine a value of the calibration DAC (the "calibration DAC value") that sets the one or more outputs to one or more determined levels; and
    hardware and/or firmware logic to calibrate the circuit by setting the calibration DAC to the determined calibration DAC value.

3. The laser diode preamplifier of claim 1, wherein the circuit further comprises:
    a temperature compensation DAC;
    hardware and/or firmware logic to determine, based at least in part on monitoring at least one output, a value for the temperature compensation DAC (the "temperature compensation DAC value") that further reduces a thermal drift of the laser diode output power; and hardware and/or firmware logic to set the temperature-compensation DAC to the determined temperature compensation DAC value.

4. The laser diode preamplifier of claim 3, wherein:

the circuit further comprises:

hardware and/or firmware logic to measure, across a range of ambient temperatures, output values from the at least one output; and the determined temperature compensation DAC value minimizes a drift of the output value across the range of temperatures.

5. The laser diode preamplifier of claim 1, wherein:

at least one of the inputs provides data from the at least one output of the circuit; and the determined BCS DAC value produces an acceptable value of a parameter derived the at least one output of the circuit.

6. The laser diode preamplifier of claim 5, wherein:

the at least one input comprises:

a positive input pin of a fly height sensor that provides a positive bias current; and a negative input pin of the fly height sensor that provides a negative bias current; and the parameter is a differential voltage between a voltage of the positive input pin and a voltage of the negative input pin.

7. The laser diode preamplifier of claim 6, further comprising:

hardware and/or firmware logic to configure the BCS DAC to scale the positive bias current when a measured temperature value is higher than a measured laser diode output power value; and hardware and/or firmware logic to configure the BCS DAC to scale the negative bias current when the measured temperature value is lower than the measured laser diode output power value.

8. The laser diode preamplifier of claim 7, wherein configuring the BCS DAC comprises setting a polarity of the BCS DAC.

9. The laser diode preamplifier of claim 6, wherein the hardware and/or firmware logic to determine the BCS DAC value comprises:

hardware and/or firmware logic to sweep the BCS DAC through a plurality of BCS DAC values; and hardware and/or firmware logic to monitor the differential voltage while sweeping the BCS DAC through the plurality of values.

10. The laser diode preamplifier of claim 6, wherein the hardware and/or firmware logic to determine the BCS DAC comprises:

hardware and/or firmware logic to calculate the BCS DAC value.

11. The laser diode preamplifier of claim 10, wherein the acceptable value is:

an analog value or an absolute analog value at a lower bound of a valid range of values of the differential voltage; or a digital value of the differential voltage of zero.

12. The laser diode preamplifier of claim 5, wherein monitoring the one or more outputs comprises receiving, from the at least one output, a laser power transducer value from a first transducer that measures laser power output, a reference transducer value from a second transducer that measures a reference temperature value, and a thermal asperity transducer value from a third transducer that measures thermal asperity in a fly-height sensor.

13. A laser diode preamplifier that drives a laser diode in a hard disc drive, the preamplifier comprising:

a circuit, comprising:

a bias-current-skewing (BCS) digital-to-analog converter (DAC) that scales a first current from at least one of the one or more inputs;

hardware and/or firmware logic to reduce thermal drift of output power of the laser diode by setting the BCS DAC to a determined BCS DAC value;

a temperature compensation DAC that modifies a differential between a second current in a positive leg and a third current in a negative leg of the circuit; and hardware and/or firmware logic to further reduce the thermal drift of the output power of the laser diode by setting the temperature compensation DAC to a determined temperature compensation DAC value.

14. The laser diode preamplifier of claim 13, wherein the circuit further comprises:

a calibration DAC that adjusts one or more of the second current or the third current; and hardware and/or firmware logic to calibrate an output of the circuit to a determined level by setting the calibration DAC to a determined calibration DAC value.

15. The laser diode preamplifier of claim 13, wherein circuit further comprises hardware and/or firmware logic to determine the BCS DAC value.

16. The laser diode preamplifier of claim 15, wherein:

the circuit further comprises:

a positive input pin of a fly height sensor that provides a positive bias current; and a negative input pin of the fly height sensor that provides a negative bias current; and the determined BCS DAC value produces an acceptable value of a differential voltage between the positive input pin and the negative input pin.

17. The laser diode preamplifier of claim 16, wherein the hardware and/or firmware logic to determine the BCS DAC value comprises:

hardware and/or firmware logic to sweep the BCS DAC through a plurality of values; and hardware and/or firmware logic to monitor the differential voltage while sweeping the BCS DAC through the plurality of values.

18. The laser diode preamplifier of claim 16, wherein the hardware and/or firmware logic to determine a value of the BCS DAC comprises:

logic to calculate the BCS DAC value that produces an acceptable value of the differential voltage.

19. A hard disk drive, comprising:

a storage medium;

a write head;

a laser diode that assists the write head in recording data to the storage medium; and a laser diode preamplifier, comprising:

a circuit, comprising:

one or more inputs;

one or more outputs;

hardware and/or firmware logic to monitor at least one output of the circuit;

a bias-current-skewing (BCS) digital-to-analog converter (DAC) that scales a first current from at least one of the one or more inputs; and hardware and/or firmware logic to reduce thermal drift of output power of the laser diode by setting the BCS DAC to a determined value.

20. The hard disk drive of claim 19, wherein the circuit further comprises:

a temperature compensation DAC that modifies a differential between a second current in a positive leg and a third current in a negative leg of the circuit; and hardware and/or firmware logic to further reduce the thermal drift of the output power of the laser diode by setting the temperature compensation DAC to a second determined value;

a calibration DAC that adjusts one or more of the second current or the third current; and hardware and/or firmware logic to calibrate an output of the circuit to a determined level by setting the calibration DAC to a third determined value.

* * * * *